(12) United States Patent
Huang et al.

(10) Patent No.: US 12,556,284 B2
(45) Date of Patent: Feb. 17, 2026

(54) OPTICAL TRANSMITTER THAT TRANSMITS MULTI-LEVEL SIGNAL

(71) Applicant: Fujitsu Limited, Kawasaki (JP)

(72) Inventors: Guoxiu Huang, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 18/353,224

(22) Filed: Jul. 17, 2023

(65) Prior Publication Data

US 2024/0137127 A1 Apr. 25, 2024

(30) Foreign Application Priority Data

Oct. 17, 2022 (JP) ................................. 2022-165969

(51) Int. Cl.
*H04B 10/50* (2013.01)
*H04B 10/61* (2013.01)

(52) U.S. Cl.
CPC ..... *H04B 10/50572* (2013.01); *H04B 10/613* (2013.01)

(58) Field of Classification Search
None
See application file for complete search history.

(56) References Cited

U.S. PATENT DOCUMENTS

| | | | | |
|---|---|---|---|---|
| 2002/0058487 | A1* | 5/2002 | Takeuchi | H03J 7/00 455/260 |
| 2009/0142076 | A1* | 6/2009 | Li | H04B 10/6165 398/208 |
| 2010/0091624 | A1* | 4/2010 | Honma | G11B 20/10055 369/47.48 |
| 2016/0006515 | A1 | 1/2016 | Kojima et al. | |
| 2020/0136885 | A1* | 4/2020 | Zuo | H04L 25/4975 |
| 2021/0175966 | A1* | 6/2021 | Rohde | H04B 7/2125 |

FOREIGN PATENT DOCUMENTS

| | | |
|---|---|---|
| JP | 2014-64170 | 4/2014 |
| JP | 2017-513347 | 5/2017 |

\* cited by examiner

*Primary Examiner* — Darren E Wolf
(74) *Attorney, Agent, or Firm* — STAAS & HALSEY LLP

(57) ABSTRACT

An optical transmitter includes a signal processor and transmission circuit. The signal processor modulates a first signal to generate a first modulated signal, determines a modulo amplitude that is larger than an amplitude of the first modulated signal, inserts a second modulated signal into the first modulated signal to generate a transmission signal, corrects a symbol of the transmission signal by using an amplitude of one or a plurality of previous symbols to generate a pre-equalized signal, and performs modulo calculation based on the modulo amplitude on the pre-equalized signal. The transmission circuit generates a modulated optical signal based on an output signal of the signal processor and transmits the modulated optical signal to a reception node. An amplitude of the second modulated signal is equal to the modulo amplitude.

7 Claims, 14 Drawing Sheets

OPTICAL TRANSMITTER THAT TRANSMITS MULTI-LEVEL SIGNAL

CROSS-REFERENCE TO RELATED APPLICATION

This application is based upon and claims the benefit of priority of the prior Japanese Patent Application No. 2022-165969, filed on Oct. 17, 2022, the entire contents of which are incorporated herein by reference.

FIELD

The embodiments discussed herein are related to an optical transmitter that transmits a multi-level signal and an optical transmission system.

BACKGROUND

Large-capacity optical communication is achieved by an increase in the number of bits to be carried by each symbol and/or an increase in a baud rate. In order to increase the number of bits to be carried by each symbol, large transmission power is requested, and the power consumption of an optical transmitter increases. Alternatively, a distance between signal points decreases, and this results in a deterioration in an error rate in some cases. On the other hand, in the case of increasing the baud rate, it is requested that an electric circuit in addition to an optical circuit be speeded up. However, there is a limit to the speeding-up of the electric circuit in the transmitter. For example, it is not easy to manufacture a digital-to-analog converter (DAC) having a bandwidth that corresponds to ultra-high-speed communication.

In a case where a bandwidth of the digital-to-analog converter is insufficient for a baud rate of a transmission signal, an influence of an amplitude component of one or a plurality of immediately previous symbols may deteriorate the quality of a transmission symbol. For example, in the case of transmitting a multi-level signal, such as a quadrature amplitude modulation (QAM) signal, an error occurs in an amplitude or a phase of a transmission symbol. When an error has occurred in an amplitude or a phase of the multi-level signal, a reception node may fail to correctly recover data. Therefore, an optical transmitter may perform pre-equalization for compensating for an influence of one or a plurality of immediately previous symbols. For example, Tomlinson-Harashima precoding compensates for waveform distortion that corresponds to an amplitude of one or a plurality of immediately previous symbols. In this case, THP performs coding and precoding on a transmission signal in such a way that an amplitude of the transmission signal does not exceed an input range of the DAC. This enables transmission of a high-speed signal that exceeds a bandwidth of an electric circuit (in particular, the DAC).

Note that a method for generating a constant modulus multi-dimensional code in coherent optical communication has been proposed (for example, Japanese Laid-open Patent Publication No. 2017-513347).

In an optical coherent communication system, a reception node compensates for distortion of a received signal and recovers data. At this time, a transmission node may insert a pilot signal into a main signal. In this case, the reception node can compensate for distortion of the main signal by using the pilot signal.

It is requested that the reception node easily perform polarization separation, transmission characteristics estimation, phase noise compensation on the pilot signal to be used to compensate for the distortion of the main signal. Therefore, the pilot signal is generated according to a modulation scheme having a small number of signal points. For example, the pilot signal is a quadrature phase shift keying (QPSK) signal. QPSK transmits 2-bit data by using four signal points.

However, in a case where the pilot signal is inserted into the main signal in a configuration in which an optical transmitter processes a signal according to THP described above, THP processing is performed on the pilot signal in addition to the main signal. When THP signal is performed on the pilot signal, the number of signal points for transmitting the pilot signal increases in some cases. For example, when THP processing is performed on the QPSK signal, each symbol is mapped to any of 16 signal points.

When the number of signal points increases, it is difficult for the reception node to perform polarization separation, transmission characteristics estimation, and/or phase noise compensation. Alternatively, a configuration of a circuit that performs polarization separation, transmission characteristics estimation, and/or phase noise compensation becomes complicated.

SUMMARY

According to an aspect of the embodiments, an optical transmitter includes: a signal processor configured to modulate a first signal to generate a first modulated signal, determine a modulo amplitude that is larger than an amplitude of the first modulated signal, insert a second modulated signal into the first modulated signal to generate a transmission signal, correct a symbol of the transmission signal by using an amplitude of one or a plurality of previous symbols to generate a pre-equalized signal, and perform modulo calculation based on the modulo amplitude on the pre-equalized signal; and a transmission circuit configured to generate a modulated optical signal based on an output signal of the signal processor and transmit the modulated optical signal to a reception node. An amplitude of the second modulated signal is equal to the modulo amplitude.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
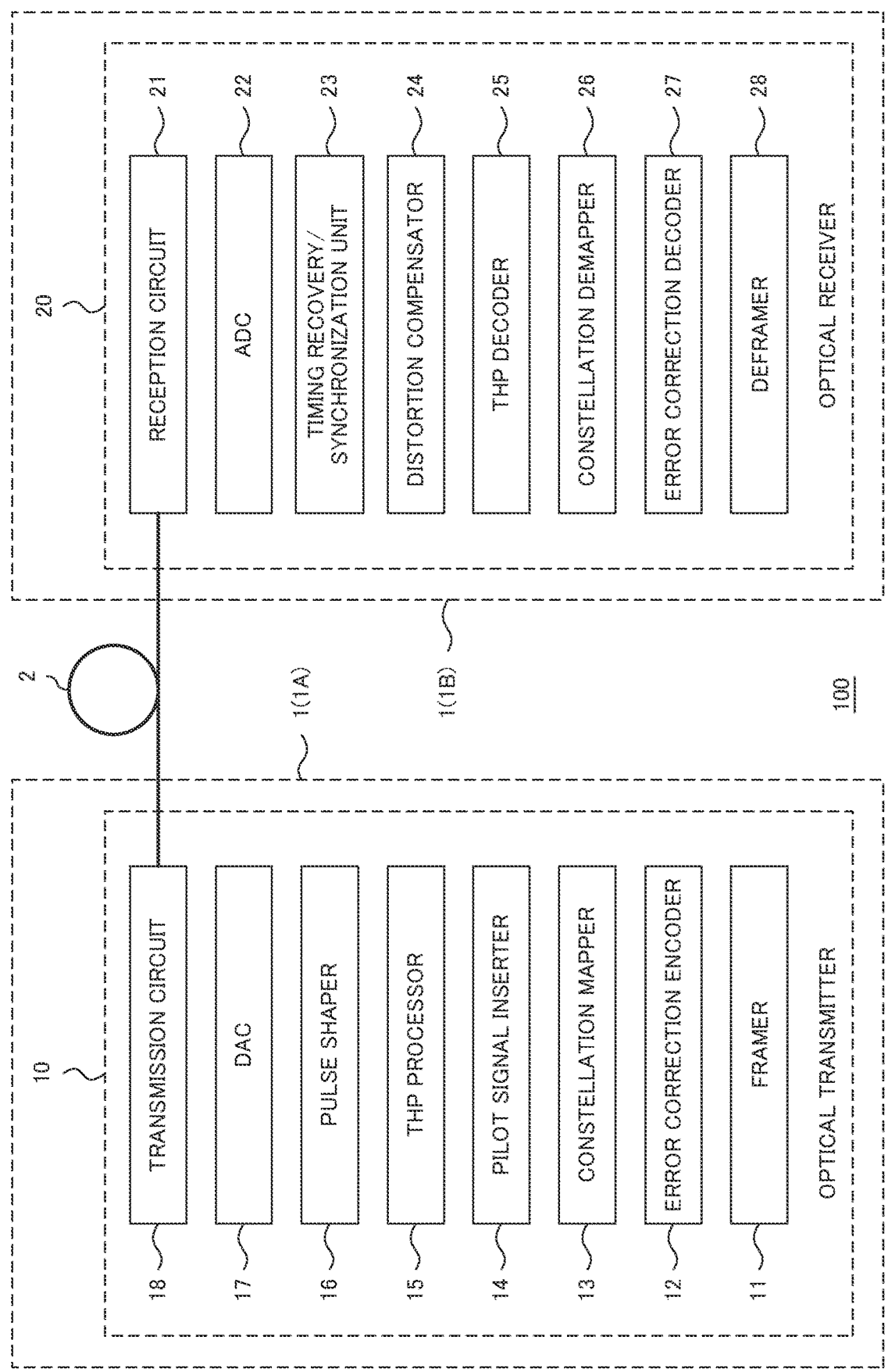
FIG. 1 illustrates an example of an optical transmission system according to an embodiment of the present invention.

FIG. 1 illustrates an example of an optical transmission system according to an embodiment of the present invention. An optical transmission system 100 according to an embodiment of the present invention includes a pair of optical transmission devices 1 (1A and 1B). Between the optical transmission device 1A and the optical transmission device 1B, an optical fiber transmission line 2 is provided. In the description below, it is assumed that an optical signal is transmitted from the optical transmission device 1A to the optical transmission device 1B. Therefore, the optical transmission device 1A includes an optical transmitter 10, and the optical transmission device 1B includes an optical receiver 20. However, the optical transmission device 1A and the optical transmission device 1B may bidirectionally transmit an optical signal. Stated another way, each of the optical transmission devices 1 (1A and 1B) may include an optical transceiver including the optical transmitter 10 and the optical receiver 20.

The optical transmitter 10 includes a framer 11, an error correction encoder 12, a constellation mapper 13, a pilot signal inserter 14, a THP processor 15, a pulse shaper 16, a digital-to-analog converter (DAC) 17, and a transmission circuit 18. The optical transmitter 10 may include other functions or circuits that are not illustrated in FIG. 1.

The framer 11 generates a frame that stores client data. The framer 11 is not particularly limited, but may generate an optical transport network (OTN) frame. The error correction encoder 12 gives an error correction code to the frame generated by the framer 11. In the description below, an output signal of the error correction encoder 12 may be referred to as a "main signal".

The constellation mapper 13 maps the main signal to a signal point on a constellation in accordance with a specified modulation scheme. For example, in 16QAM, 16 signal points are defined on the constellation, and each symbol carries 4 bits. In this case, the main signal is divided each 4 bits, and each 4-bit data is allocated to a corresponding signal point. Each of the signal points indicates an amplitude and a phase. Accordingly, the main signal is modulated by the constellation mapper 13. Note that the constellation mapper 13 is an example of a modulator that modulates an input signal to generate a modulated signal.

The pilot signal inserter 14 inserts a pilot signal into an output signal (that is, a modulated main signal) of the constellation mapper 13. The pilot signal is periodically inserted, for example. Furthermore, the pilot signal is used in a reception node to perform polarization separation and/or phase noise compensation on the main signal. Therefore, a modulation level of the pilot signal is lower than a modulation level of the main signal. Here, the modulation level corresponds to the number of signal points or the number of bits carried by each symbol. For example, when the main signal is modulated according to 16QAM, the pilot signal is modulated according to QPSK. In QPSK, four signal points are defined on the constellation, and each symbol carries 2 bits. Note that the main signal into which the pilot signal is inserted may be referred to as a "transmission signal".

The THP processor 15 performs, on the transmission signal, pre-equalization for compensating for a deterioration in frequency characteristics. Specifically, the processor 15 performs THP pre-equalization for correcting each symbol of the transmission signal in accordance with an amplitude of one or a plurality of immediately previous symbols. Stated another way, the THP processor 15 performs an operation as a feedback equalizer on an input signal. As a result of this, a pre-equalized signal is generated. Then, the THP processor 15 performs modulo calculation based on a modulo amplitude on the pre-equalized signal. Note that a configuration and an operation of the THP processor 15 will be described later.

The pulse shaper 16 shapes a pulse waveform of an output signal of the THP processor 15. Note that the pulse shaper 16 may shape the pulse waveform by using a Nyquist filter. The DAC 17 converts an output signal of the pulse shaper 16 into an analog signal. The transmission circuit 18 includes a laser light source and an optical modulator. The laser light source generates CW (continuous wave) light having a specified wavelength. The optical modulator modulates the CW light by using an output signal of the DAC 17 to generate a modulated optical signal. This modulated optical signal is transmitted via the optical fiber transmission line 2, and is received by the optical transmission device 1B.

The optical receiver 20 is connected to the optical fiber transmission line 2. The optical receiver 20 includes a reception circuit 21, an analog-to-digital converter (ADC) 22, a timing recovery/synchronization unit 23, a distortion compensator 24, a THP decoder 25, a constellation demapper 26, an error correction decoder 27, and deframer 28. Note that the optical receiver 20 may include other functions or circuits that are not illustrated in FIG. 1.

The reception circuit 21 receives, via the optical fiber transmission line 2, the modulated optical signal transmitted from the optical transmitter 10. The reception circuit 21 includes, for example, a coherent receiver. In this case, the reception circuit 21 includes a local light source, and generates an electric field information signal indicating a reception optical signal. The ADC 22 converts an output signal of the reception circuit 21 into a digital signal. The timing recovery/synchronization unit 23 establishes synchronization of a reception signal.

Figure 2:
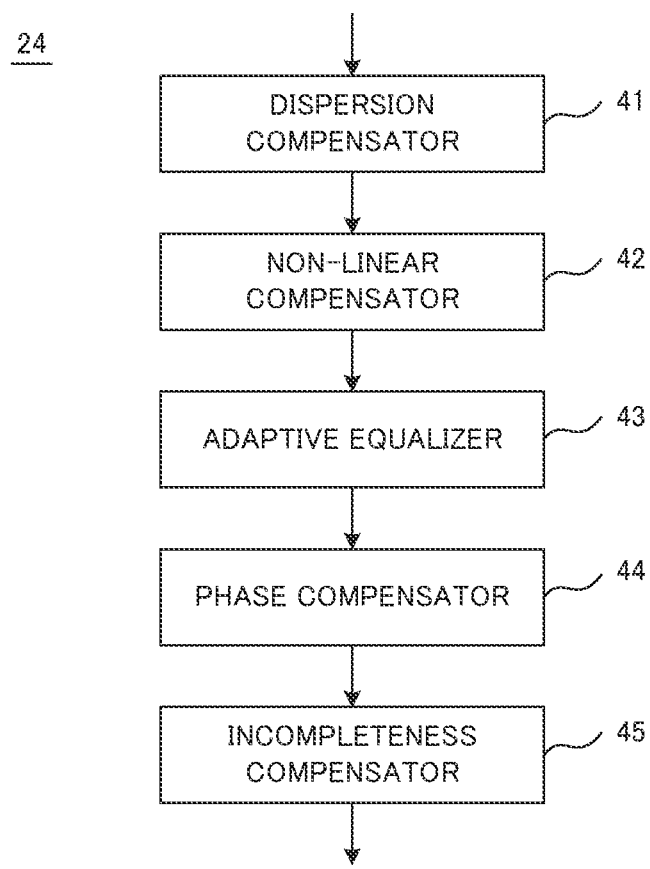
FIG. 2 illustrates an example of a distortion compensator that compensates for distortion of a received signal in an optical receiver.

The distortion compensator 24 compensates for distortion of the reception signal. In this example, the distortion compensator 24 extracts the pilot signal from the reception signal, and compensates for distortion of the main signal by using the pilot signal. Here, the distortion compensator 24 includes a dispersion compensator 41, a non-linear compensator 42, an adaptive equalizer 43, a phase compensator 44, and an incompleteness compensator 45, as illustrated in FIG. 2. Note that the distortion compensator 24 receives, as an input, an electric field information signal indicating an electric field of the reception signal.

The dispersion compensator 41 compensates for dispersion (principally, chromatic dispersion) of an optical transmission line between the optical transmitter 10 and the optical receiver 20. The non-linear compensator 42 compensates for non-linear distortion that has occurred in an optical transmission line. The adaptive equalizer 43 compensates for distortion that remains in an output signal of the non-linear compensator 42. Furthermore, when an optical signal received by the optical receiver 20 is a polarization multiplexed optical signal, the adaptive equalizer 43 may have a function to separate polarizations. The phase compensator 44 compensates for phase noise. For example, the phase compensator 44 may estimate and compensate for a phase offset between the optical transmitter 10 and the optical receiver 20. The incompleteness compensator 45 compensates for distortion caused by incompleteness of the optical transmitter 10.

The THP decoder 25 performs THP processing on the main signal in which distortion has been compensated for. Stated another way, when an amplitude of an input signal is larger than a modulo amplitude, the THP decoder 25 performs modulo calculation based on the modulo amplitude on the input signal. Note that the THP decoder 25 does not need to perform pre-equalization in contrast to the THP processor 15.

The constellation demapper 26 performs demapping process that corresponds to mapping process performed by the constellation mapper 13. Stated another way, the constellation demapper 26 decides a signal point of a received signal, and recovers data that corresponds to the decided signal point. Furthermore, the constellation demapper 26 removes the pilot signal. By doing this, the main signal is recovered. The error correction decoder 27 performs error correction process on the recovered main signal. The deframer 28 converts a frame output from the error correction decoder 27 into a bit stream. By doing this, client data is recovered.

Figure 3A:
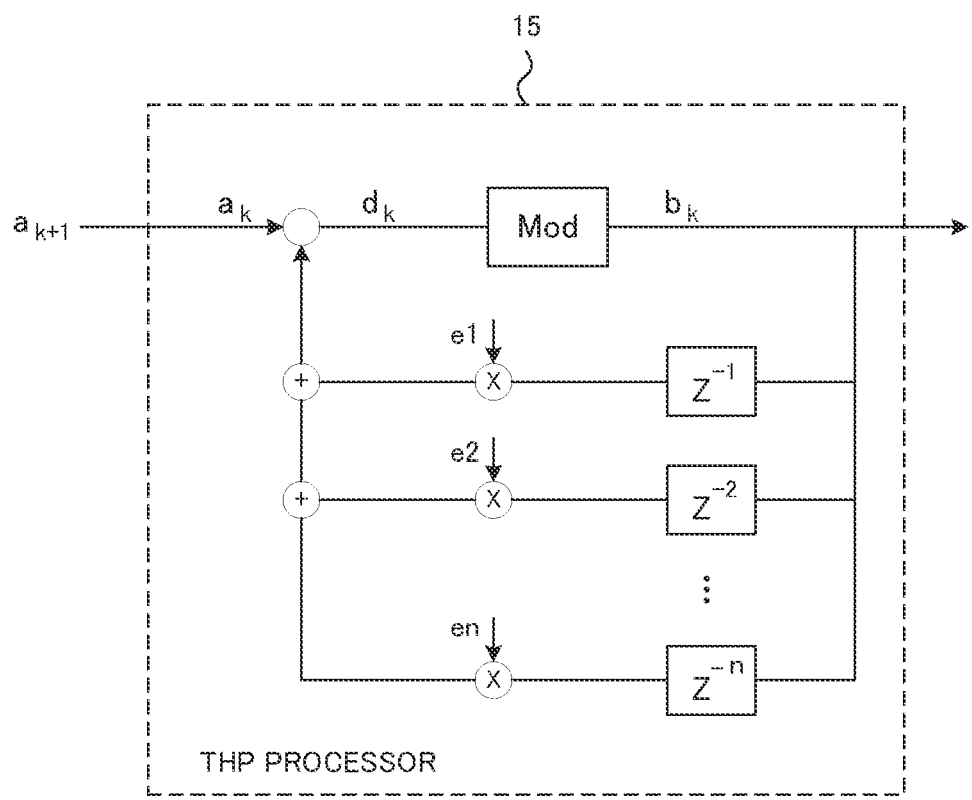
FIGS. 3A and 3B illustrate an example of a THP processor.
Figure 3B:
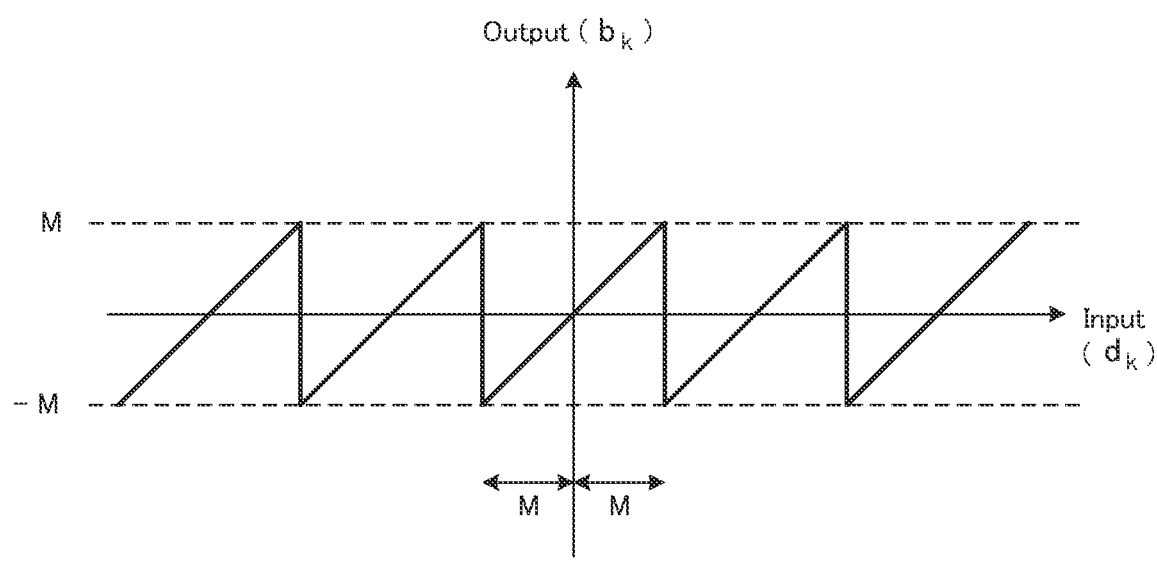

FIGS. 3A and 3B illustrate an example of the THP processor 15 that is implemented in the optical transmitter 10. The THP processor 15 corrects a transmission symbol ak in accordance with amplitudes of n symbols that precede the transmission symbol ak. Specifically, the THP processor 15 includes n delay elements Z in order to feed back amplitude information of n symbols that precede the transmission symbol ak, as illustrated in FIG. 3A. Each of n multipliers multiplies an output signal of a corresponding delay element Z by a corresponding coefficient e (e1 to en). The coefficient e is determined in advance based on frequency characteristics of a system that limits a bandwidth in such a way that inter-symbol interference is restrained. As an example, the coefficient e is determined by a system in such a way that inter-symbol interference is restrained. Furthermore, the coefficient e may be determined based on frequency characteristics of a monitored system. Then, an output signal of each of the multipliers is added to the transmission symbol ak.

In the description below, a signal generated by performing feedback calculation on the transmission symbol ak may be referred to as a "pre-equalized signal dk". Furthermore, feedback calculation performed by the THP processor 15 may be referred to as "feedback equalization". Moreover, a circuit that performs feedback equalization in the THP processor 15 is an example of a correction unit that corrects each symbol of a transmission signal in accordance with an amplitude of one or a plurality of immediately previous symbols to generate a pre-equalized signal.

Feedback equalization performed by the THP processor 15 is expressed by Formula (1). Note that a variable i identifies n symbols that precede the transmission symbol ak. Therefore, a range of the variable i is 1 to n.

$$d_k = a_k + \sum_{i}^{n} e_i b_{k-i} \tag{1}$$

A modulo calculator Mod performs modulo calculation on the pre-equalized signal dk. Stated another way, when an amplitude of the pre-equalized signal dk is larger than a specified modulo amplitude, the modulo calculator Mod corrects a value of the pre-equalized signal dk based on the modulo amplitude. Specifically, as illustrated in FIG. 3B, when the amplitude of the pre-equalized signal dk is larger than the modulo amplitude, the modulo calculator Mod corrects a value of the pre-equalized signal dk in such a way that the amplitude of the pre-equalized signal dk is smaller than the modulo amplitude. It is assumed, for example, that the modulo amplitude is "M". In this case, when a value of the pre-equalized signal dk on a constellation is larger than "M", "2M" is subtracted from the value of the pre-equalized signal dk. When the value of the pre-equalized signal dk on the constellation is smaller than "–M", "2M" is added to the value of the pre-equalized signal dk.

The modulo amplitude is determined, for example, not to exceed an input range of the DAC 17. In this case, a digital signal indicating a transmission symbol is converted into a correct analog value. In addition, it is preferable that the modulo amplitude be determined to a value that is close to a width of the input range of the DAC 17. This configuration enables an amplitude or power of the transmission symbol to be increased.

Calculation performed by the modulo calculator Mod is expressed by Formula (2). Note that bk indicates a signal that is output from the modulo calculator Mod. dk indicates a pre-equalized signal generated by performing feedback equalization.

$$b_k = d_k \pm 2M$$

$$b_k \in [-M, M] \tag{2}$$

Then, if dk expressed by Formula (1) is given to (2), Formula (3) is obtained.

$$b_k = a_k \pm 2M + \sum_{i}^{n} e_i b_{k-i} \tag{3}$$

$$C_k = a_k \pm 2M \tag{4}$$

Figure 4:
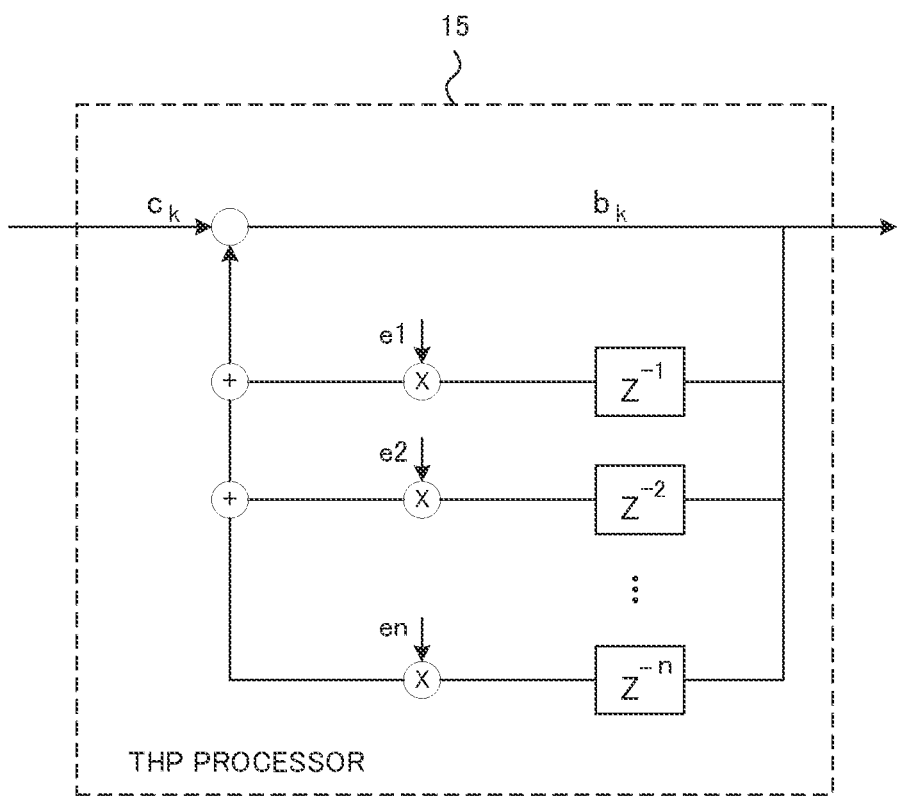
FIG. 4 illustrates an example of a configuration that feeds back a pre-equalized signal.

Here, if "ak±2M" in Formula (3) is expressed as "ck" (as shown in Formula (4)), the THP processor 15 is expressed as the configuration illustrated in FIG. 4. Stated another way, an output signal bk of the THP processor 15 is obtained by performing feedback equalization on a signal ck. Therefore, the reception node can recover data by demodulating the signal ck.

Note that the transmission symbol ak is expressed by a complex number. Stated another way, the transmission symbol ak is expressed by a value of a real part and a value of an imaginary part. Then, the THP processor 15 performs feedback equalization and modulo calculation on each of the real part and the imaginary part.

Figure 5A:
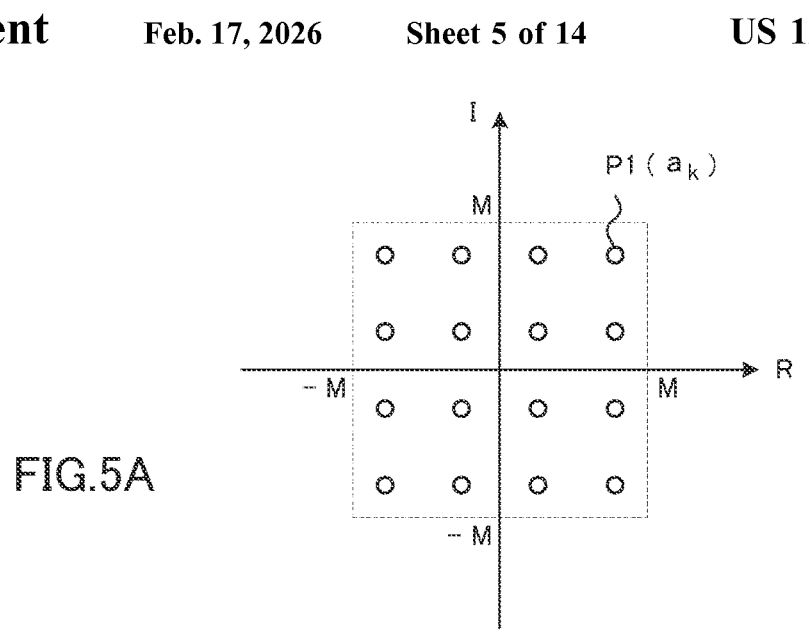
FIGS. 5A to 5C are diagrams explaining encoding and decoding according to THP.
Figure 5B:
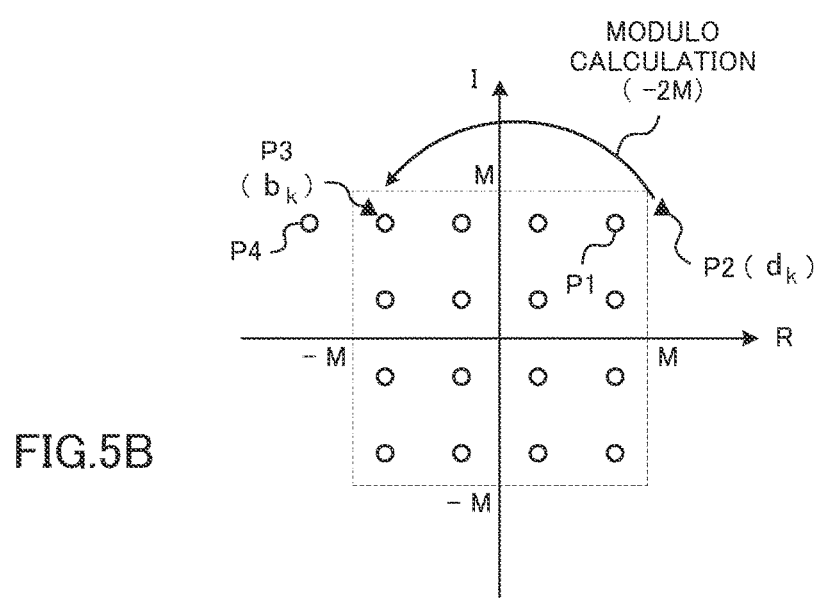
Figure 5C:
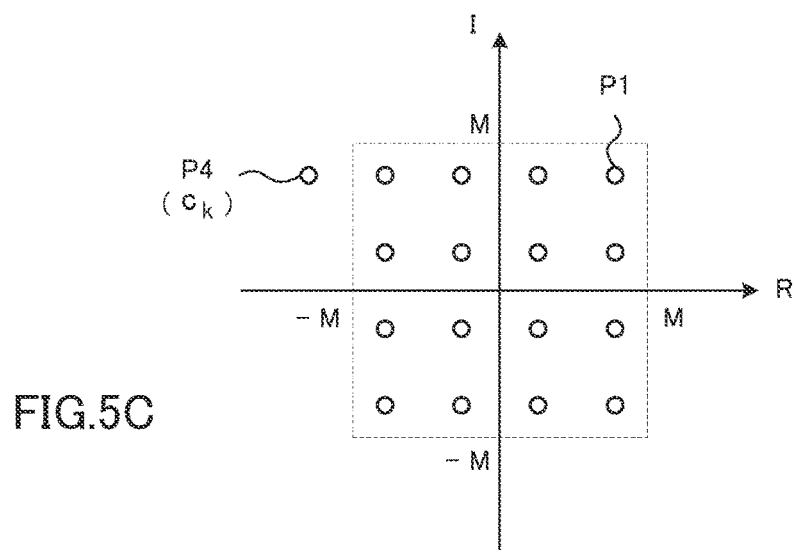

FIGS. 5A to 5C are diagrams explaining encoding and decoding according to THP. Note that the constellations illustrated in FIGS. 5A to 5C indicate a phase and an amplitude of a signal. A horizontal axis indicates a real component (R), and a vertical axis indicates an imaginary component (I). Furthermore, in this example, a transmission signal is modulated according to 16 QAM, and is transmitted. In this case, each transmission symbol is allocated to one of 16 signal points illustrated in FIG. 5A. In this example, it is assumed that the transmission symbol ak is allocated to Signal Point P1.

The THP processor 15 performs the feedback equalization illustrated in FIG. 3A on the transmission symbol ak. As a result of this, a symbol dk is generated. In this example, it is assumed that electric field information (namely, an amplitude and a phase) of the symbol dk is indicated by Point P2, as illustrated in FIG. 5B. Stated another electric way, field information for transmitting the symbol ak is corrected from Point P1 to Point P2 as a result of feedback equalization. Here, a value of a real part of the symbol dk is larger than "M". Accordingly, the THP processor 15 subtracts "2M" from the value of the real part of the symbol dk. As a result of this, the symbol bk is generated. Electric field information of the symbol bk is indicated by Point P3.

The optical transmitter 10 transmits the symbol bk by using an amplitude and a phase that are indicated by Point P3. At this time, a component added as a result of feedback equalization is substantially canceled in the DAC 17 and the transmission line. Therefore, in the reception node, the electric field information of the symbol bk is substantially indicated by Point P4. Note that electric field information of Point P4 is obtained by shifting a value of a real part of Signal Point P1 by "−2M".

In the reception node, a value of a real part of Point P4 is smaller than "−M", as illustrated in FIG. 5C. Therefore, the THP decoder 25 of the optical receiver 20 adds "2M" to the value of the real part of Point P4. As a result of this, a reception symbol is obtained at Point P1. Here, this signal point is the same as a signal point to which the symbol ak is allocated by the optical transmitter 10. Accordingly, the optical receiver 20 can recover the symbol ak.

Note that the modulo amplitude is determined to be a value that is larger than a maximum amplitude of the main signal. In the example illustrated in FIGS. 5A to 5C, it is assumed that a distance between signal points adjacent to each other according to 16 QAM is "2". Stated another way, it is assumed that a maximum amplitude of a 16 QAM signal is "3". In this case, the modulo amplitude is determined to be a value that is larger than "3". However, the modulo amplitude is determined not to exceed an input range of the DAC 17. Therefore, in a case where the input range of the DAC 17 is "+4", the modulo amplitude is determined to be larger than "3" but not exceed "4".

As described above, the THP processor 15 is implemented in the optical transmitter 10, and therefore a deterioration in frequency characteristics be can compensated for by performing feedback equalization, while an amplitude of a transmission signal is maintained within the input range of the DAC 17. Accordingly, even in a case where a baud rate exceeds a bandwidth limit of an electric circuit, high-quality optical communication can be achieved.

However, in the optical transmitter 10 illustrated in FIG. 1, THP processing is performed not only on the main signal but also on the pilot signal that has been inserted into the main signal. Here, in the case of a pilot signal having an inappropriate amplitude, the number of signal points to be used to transmit the pilot signal may increase. When the number of signal points has increased, a circuit that is used to recover the pilot signal in the reception node becomes complicated.

Figure 6A:
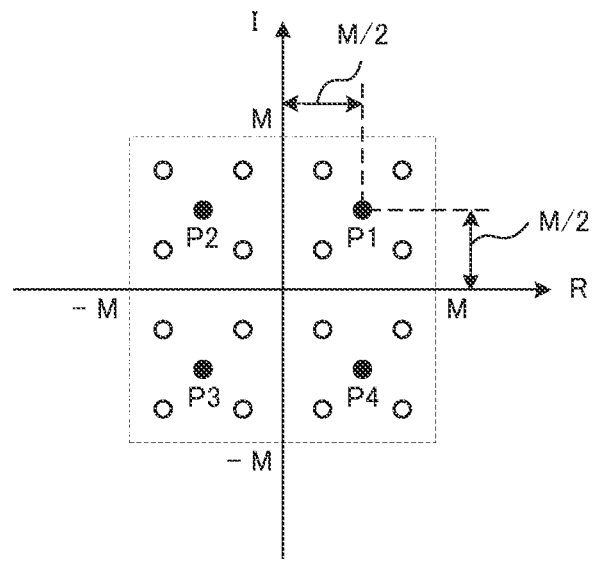
FIGS. 6A and 6B illustrate an example of a configuration of signal points for transmitting a pilot signal.
Figure 6B:
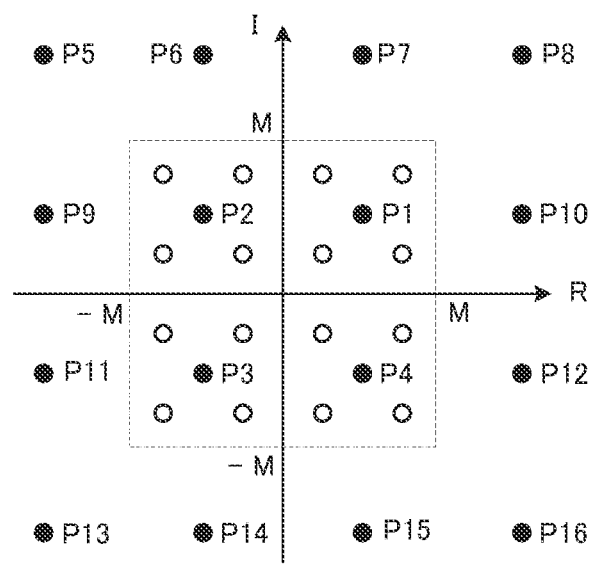

FIGS. 6A and 6B illustrate an example of a configuration of signal points for transmitting the pilot signal. In this example, the pilot signal is a QPSK signal. Furthermore, the pilot signal is transmitted by using a small amplitude in order not to cause a signal-to-noise ratio (SNR) of the main signal to deteriorate. In this example, the amplitude of the pilot signal is one half the modulo amplitude M. Stated another way, each symbol of the pilot signal is allocated to a corresponding one of four signal points P1 to P4 illustrated in FIG. 6A. Note that in FIGS. 6A and 6B, a closed circle indicates a QPSK signal point for transmitting the pilot signal, and an open circle indicates a 16 QAM signal point for transmitting the main signal.

In 16 QAM for transmitting the main signal, in a case where a distance between signal points adjacent to each other is "2", a maximum amplitude of the main signal is "3". Furthermore, it is assumed that the modulo amplitude M is "4". In the example illustrated in FIGS. 6A and 6B, an amplitude of the pilot signal is one half the modulo amplitude, "2".

When the pilot signal is provided to the THP processor 15, the feedback equalization described above is performed, and modulo calculation is further performed, if needed. As a result of this, the pilot signal is allocated to a corresponding one of 16 signal points P1 to P16 illustrated in FIG. 6B. For example, it is assumed that, as a result of performing feedback equalization on a symbol allocated to Signal Point P1, a value of a real part of this symbol is larger than "M". In this case, this symbol is transmitted by using a signal point (namely, Signal Point P9) obtained by shifting a value of a real part of Signal Point P1 by "−2M". In practice, this symbol is not transmitted by using an electric field that corresponds to Signal Point P9, but is transmitted by using an electric field calculated by adding a correction component obtained as a result of feedback equalization to an electric field component that corresponds to Signal Point P9. However, the correction component obtained as a result of feedback equalization is substantially canceled in the DAC 17 and the transmission line. Therefore, hereinafter, for simplification of description, in indicating an electric field for transmitting each symbol, the correction component obtained as a result of feedback equalization may be omitted.

As described above, when an amplitude of the pilot signal is one half the modulo amplitude M, the pilot signal is transmitted by using 16 signal points. Stated another way, the pilot signal is substantially transmitted according to 16 QAM. Therefore, a circuit that is used to recover the pilot signal in the reception node becomes complicated.

Figure 7A:
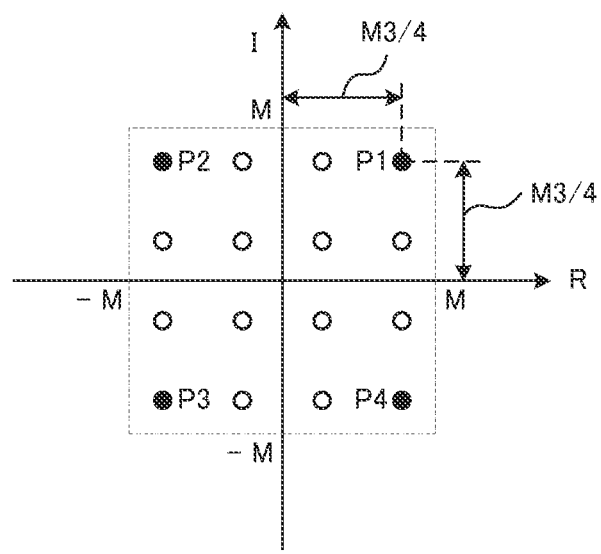
FIGS. 7A and 7B illustrate another example of a configuration of signal points for transmitting a pilot signal.
Figure 7B:
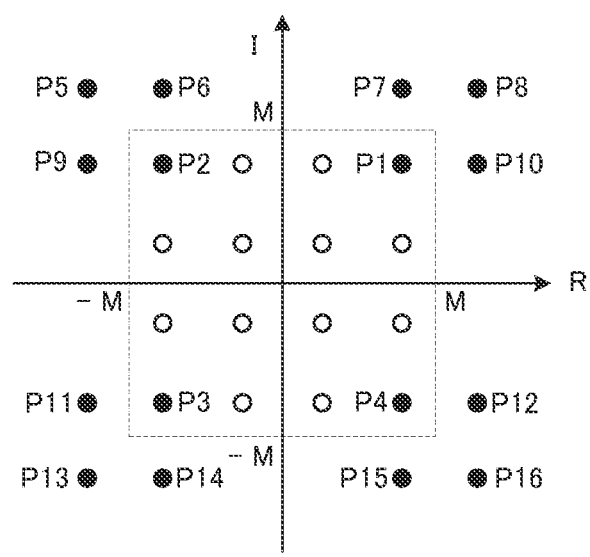

FIGS. 7A and 7B illustrate another example of a configuration of signal points for transmitting the pilot signal. In this example, an amplitude of the pilot signal is three-fourths the modulo amplitude M. Stated another way, each symbol of the pilot signal is allocated to a corresponding one of four signal points P1 to P4 illustrated in FIG. 7A. Note that in FIGS. 7A and 7B, a closed circle indicates a QPSK signal point for transmitting the pilot signal, and an open circle indicates a 16 QAM signal point for transmitting the main signal.

In this example, a maximum amplitude of the main signal is three-fourths the modulo amplitude M. Therefore, each of Signal Points P1 to P4 for transmitting the pilot signal overlaps a corresponding signal point of 16 QAM signal points for transmitting the main signal.

When the pilot signal is provided to the THP processor 15, the feedback equalization described above is performed, and modulo calculation is further performed, if needed. As a result of this, the pilot signal is allocated to a corresponding one of 16 signal points P1 to P16 illustrated in FIG. 7B. For example, as a result of performing feedback equalization on a symbol allocated to Signal Point P1, when a value of a real part of this symbol is larger than "M", this symbol is transmitted by using a signal point (namely, Signal Point P9) obtained by shifting a value of a real part of Signal Point P1 by "−2M". Alternatively, as a result of performing feedback equalization on a symbol allocated to Signal Point P3, when a value of an imaginary part of this symbol is smaller than "−M", this symbol is transmitted by using a signal point (namely, Signal Point P6) obtained by shifting a value of an imaginary part of Signal Point P3 by "2M".

As described above, when an amplitude of the pilot signal is three-fourths the modulo amplitude M, similarly, the pilot signal is transmitted by using 16 signal points. Therefore, also in this case, a circuit that is used to recover the pilot signal in the reception node becomes complicated.

Figure 8:
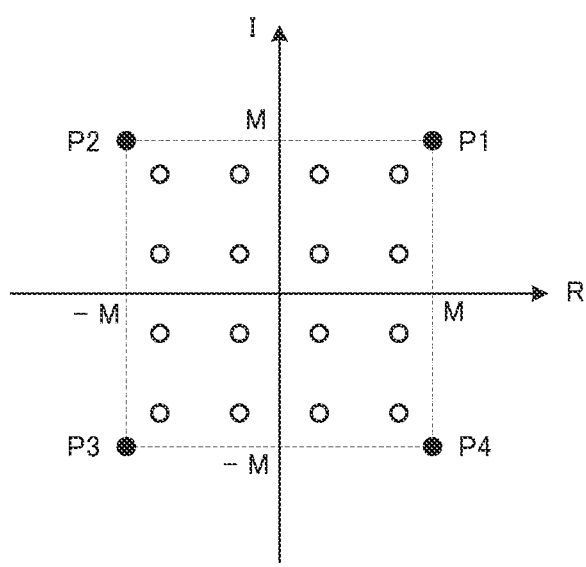
FIG. 8 illustrates an example of a configuration of signal points for transmitting a pilot signal according to the embodiment of the present invention.

FIG. 8 illustrates an example of a configuration of signal points for transmitting the pilot signal according to the embodiment of the present invention. The pilot signal is not particularly limited, but is, for example, a QPSK signal. Stated another way, the pilot signal is transmitted by using four signal points on a constellation. Note that in FIG. 8, a closed circle indicates a QPSK signal point for transmitting the pilot signal, and an open circle indicates a 16 QAM signal point for transmitting a data signal.

In the embodiment of the present invention, when the THP processor 15 performs modulo calculation based on the modulo amplitude M, an amplitude of the pilot signal is also "M". Specifically, when the pilot signal is transmitted by using Signal Points P1 to P4 illustrated in FIG. 8, each of the signal points is configured as described below.

P1: A value of a real part is M, and a value of an imaginary part is M.
P2: A value of a real part is −M, and a value of an imaginary part is M.
P3: A value of a real part is −M, and a value of an imaginary part is −M.
P4: A value of a real part is M, and a value of an imaginary part is −M.

FIGS. 9A, 9B, 10A, and 10B illustrate examples of processing performed by the THP processor 15 according to the embodiment of the present invention. The pilot signal is a QPSK signal. Furthermore, as described with reference to FIG. 8, an amplitude of the pilot signal is equal to the modulo amplitude M. Note that the examples illustrated in FIGS. 9A to 10B indicate processing performed by the THP processor 15 at a time when a symbol k that transmits the pilot signal has been allocated to Signal Point P1.

Figure 9A:
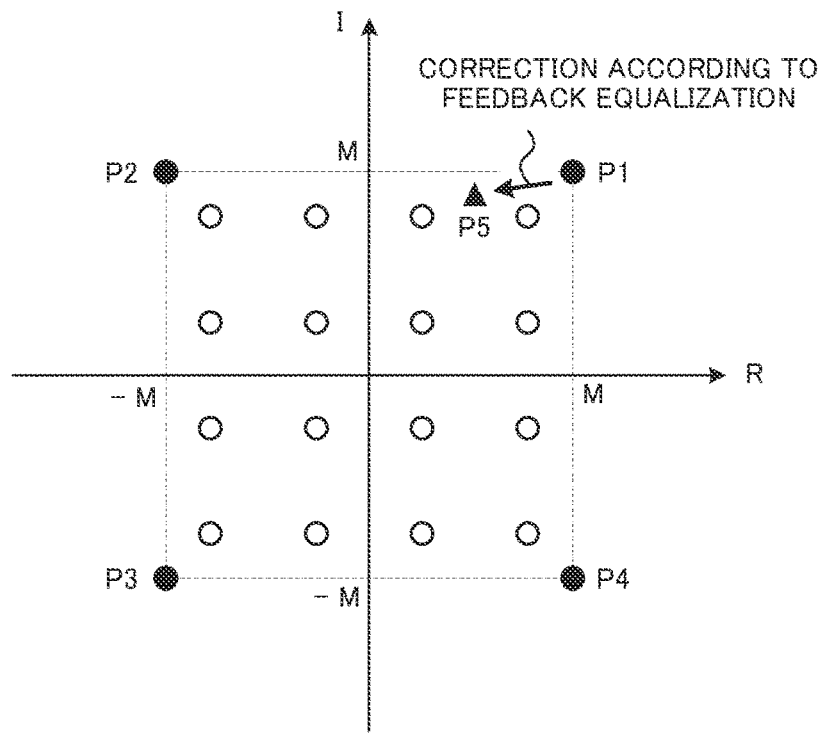
FIGS. 9A, 9B, 10A, and 10B illustrate examples of processing performed by the THP processor according to the embodiment of the present invention.

In the example illustrated in FIG. 9A, electric field information for transmitting the symbol k has been corrected from P1 to P5 on the constellation as a result of feedback calculation. Here, a value of a real part of Point P5 is larger than −M, and is smaller than M. A value of an imaginary part of Point P5 is also larger than −M, and is smaller than M. Accordingly, an output value of the modulo calculator Mod is equal to an input value of the modulo calculator Mod. Thus, the optical transmitter 10 transmits the symbol k by using an electric field indicated by Point P5.

The optical receiver 20 receives the symbol k that has been transmitted from the optical transmitter 10. Here, a correction component obtained as a result of feedback calculation is substantially canceled in the DAC 17 and the transmission line. Therefore, electric field information of the symbol k received by the optical receiver 20 is substantially indicated by Point P1. That is, the optical receiver 20 receives the symbol k at Signal Point P1.

Figure 9B:
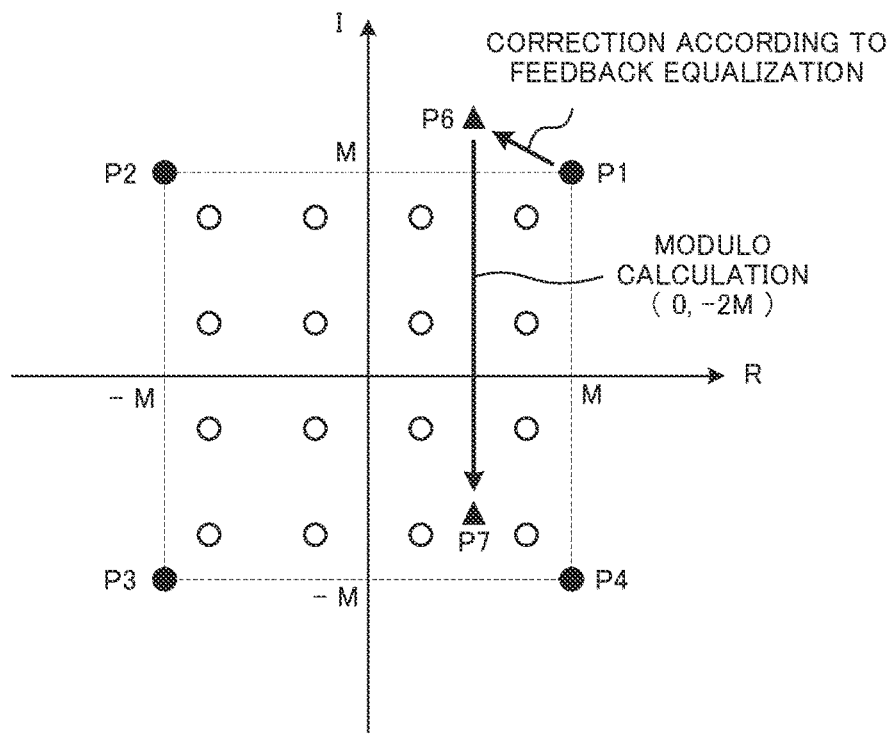

In the example illustrated in FIG. 9B, electric field information for transmitting the symbol k is corrected from P1 to P6 on the constellation as a result of feedback calculation. Here, a value of a real part of Point P6 is larger than −M, and is smaller than M. However, a value of an imaginary part of Point P6 is larger than M. In this case, the modulo calculator Mod subtracts "2M" from the value of the imaginary part of Point P6. As a result of this, Point P7 is obtained. Then, the optical transmitter 10 transmits the symbol k by using an electric field indicated by Point P7.

The optical receiver 20 receives the symbol k that has been transmitted from the optical transmitter 10. Here, a correction component obtained as a result of feedback calculation is substantially canceled in the DAC 17 and the transmission line. Therefore, electric field information of the symbol k received by the optical receiver 20 is substantially indicated by Point P4. That is, the optical receiver 20 receives the symbol k at Signal Point P4.

Figure 10A:
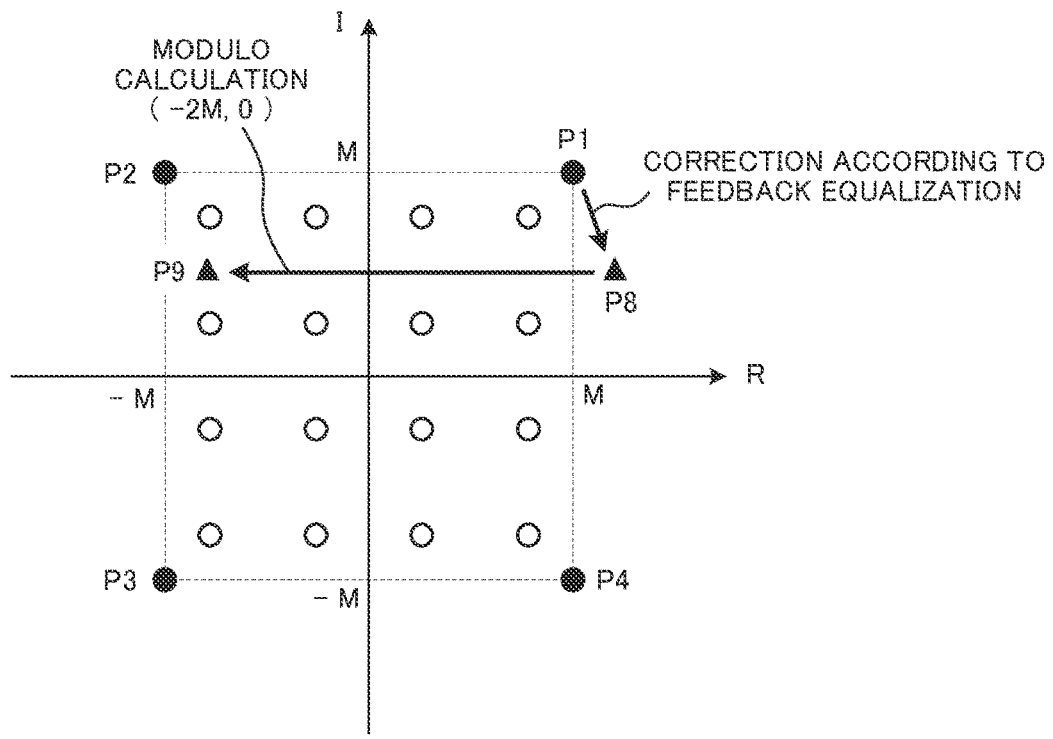

In the example illustrated in FIG. 10A, electric field information for transmitting the symbol k is corrected from P1 to P8 on the constellation as a result of feedback calculation. Here, a value of a real part of Point P8 is larger than M. Furthermore, a value of an imaginary part of Point P8 is larger than −M, and is smaller than M. In this case, the modulo calculator Mod subtracts "2M" from the value of the real part of Point P8. As a result of this, Point P9 is obtained. Then, the optical transmitter 10 transmits the symbol k by using an electric field indicated by Point P9.

The optical receiver 20 receives the symbol k that has been transmitted from the optical transmitter 10. Here, a correction component obtained as a result of feedback calculation is substantially canceled in the DAC 17 and the transmission line. Therefore, electric field information of the symbol k received by the optical receiver 20 is substantially indicated by Point P2. That is, the optical receiver 20 receives the symbol k at Signal Point P2.

Figure 10B:
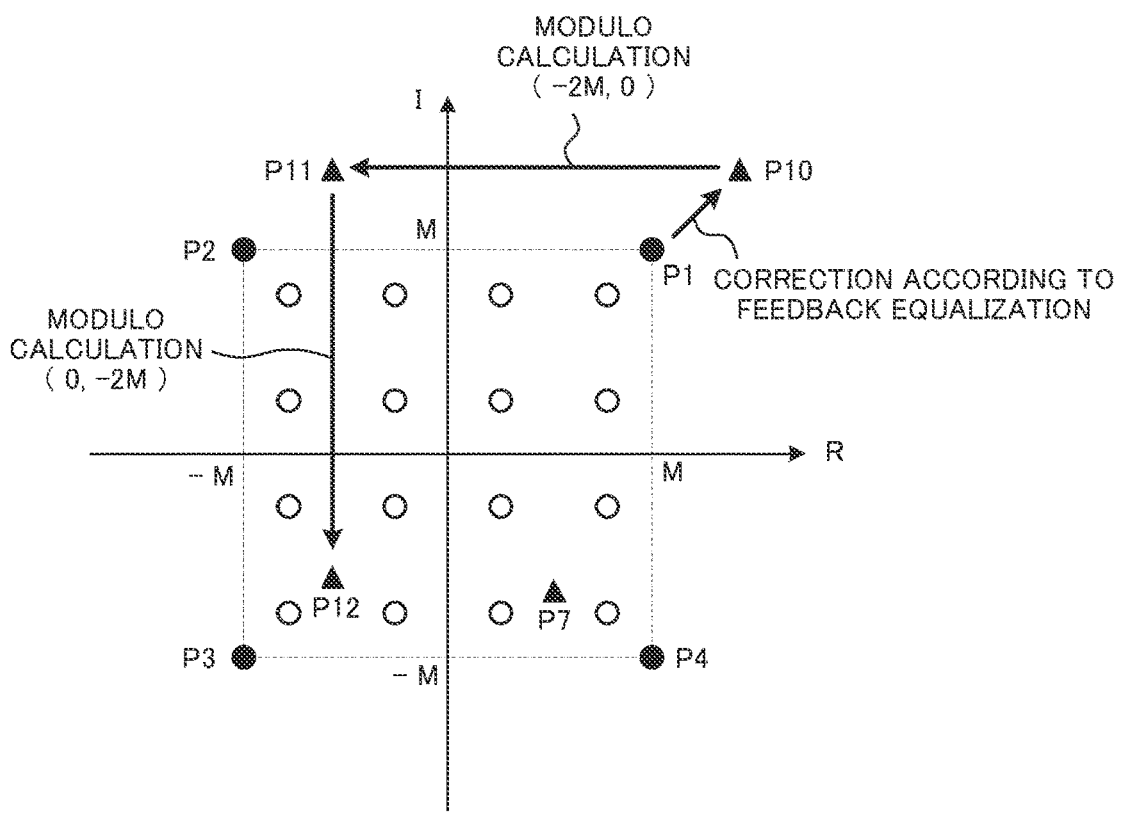

In the example illustrated in FIG. 10B, electric field information for transmitting the symbol k is corrected from P1 to P10 on the constellation as a result of feedback calculation. Here, a value of a real part of Point P10 is larger than M. A value of an imaginary part of Point P10 is also larger than M. In this case, the modulo calculator Mod subtracts "2M" from the value of the real part of Point P10. As a result of this, Point P11 is obtained. Moreover, the modulo calculator Mod subtracts "2M" from a value of an imaginary part of Point P11. As a result of this, Point P12 is obtained. Then, the optical transmitter 10 transmits the symbol k by using an electric field indicated by Point P12.

The optical receiver 20 receives the symbol k that has been transmitted from the optical transmitter 10. Here, a correction component obtained as a result of feedback calculation is substantially canceled in the DAC 17 and the transmission line. Therefore, electric field information of the symbol k received by the optical receiver 20 is substantially indicated by Point P3. That is, the optical receiver 20 receives the symbol k at Signal Point P3.

As described above, when a modulation scheme of a pilot signal is QPSK, and an amplitude of the pilot signal is equal to a modulo amplitude of the THP processor 15, the optical receiver 20 receives the pilot signal at any of Signal Points P1 to P4. That is, even in a configuration in which the optical transmitter 10 performs THP processing on the pilot signal, the optical receiver 20 can recover the pilot signal by detecting one of four symbols of QPSK. Accordingly, even in a configuration where the optical transmitter 10 performs THP processing on the pilot signal, the pilot signal can be recovered without a complicated circuit configuration.

Note that, when the optical transmitter 10 performs precoding with a modulo calculation, a signal point to which a transmission symbol is allocated by the optical transmitter 10 may be different from a signal point of a reception symbol that has been detected by the optical receiver 20. For example, in the example illustrated in FIG. 9B, a transmission symbol is allocated to Signal Point P1 by the optical transmitter, but the optical receiver 20 detects a reception symbol at Signal Point P4.

However, when a modulation scheme is QPSK, even in a case where a signal point to which a transmission symbol is allocated by an optical transmitter is different from a signal point of a reception symbol detected by an optical receiver, the transmission symbol can be recovered by using a known technology. In addition, when a data pattern of a pilot signal is known, even when the modulation scheme is not QPSK, the reception node can recover the transmission symbol.

Figure 11:
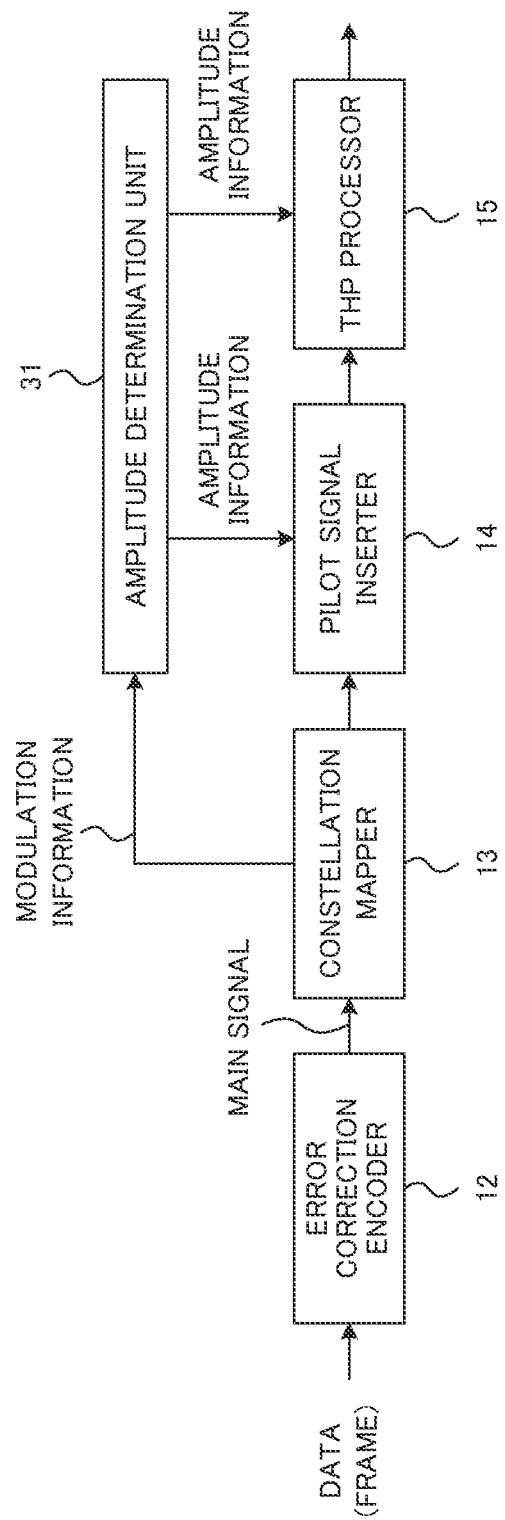
FIG. 11 illustrates an example of a configuration that determines an amplitude of a pilot signal.

FIG. 11 illustrates an example of a configuration in which the optical transmitter 10 determines an amplitude of a pilot signal. Note that the optical transmitter 10 includes an amplitude determination unit 31, but this is not illustrated in FIG. 1.

The amplitude determination unit 31 acquires modulation information. Here, the modulation information may be provided to the amplitude determination unit 31 in advance. Alternatively, the amplitude determination unit 31 may acquire the information modulation from the constellation mapper 13. The modulation information includes information indicating a modulation scheme for modulating a main signal, and information indicating a maximum amplitude according to the modulation scheme. The modulation scheme and the maximum amplitude have been a determined in advance, for example. Alternatively, network administrator may provide an instruction relating to the modulation scheme and the maximum amplitude. Note that the modulation may information include information indicating a distance between signal points adjacent to each other instead of the maximum amplitude.

The amplitude determination unit 31 determines a modulo amplitude based on the modulation information. Here, the modulo amplitude is determined to be a value that is larger than the maximum amplitude according to the modulation scheme of the main signal. However, it is preferable that the modulo amplitude be determined not to exceed an input range of the DAC 17.

Figure 12A:
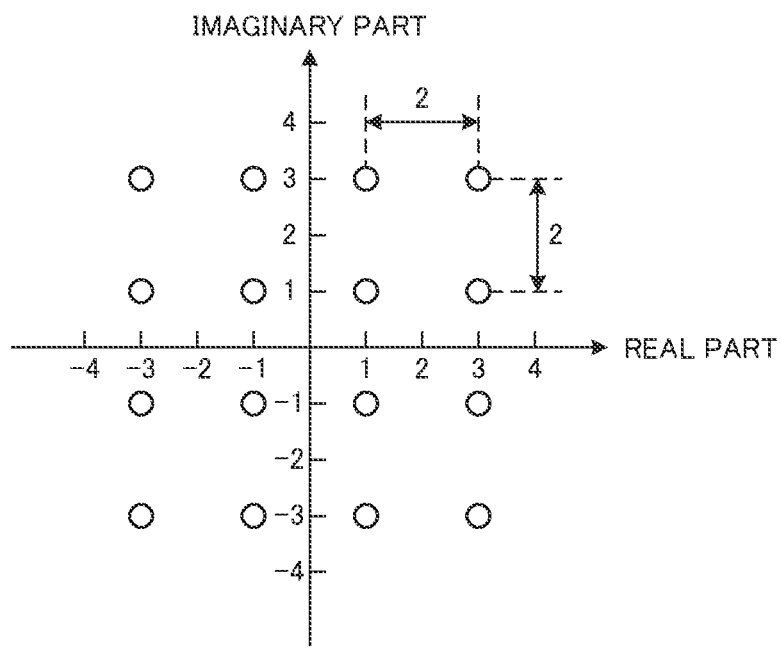
FIGS. 12A and 12B are diagrams explaining a method for determining a modulo amplitude.
Figure 12B:
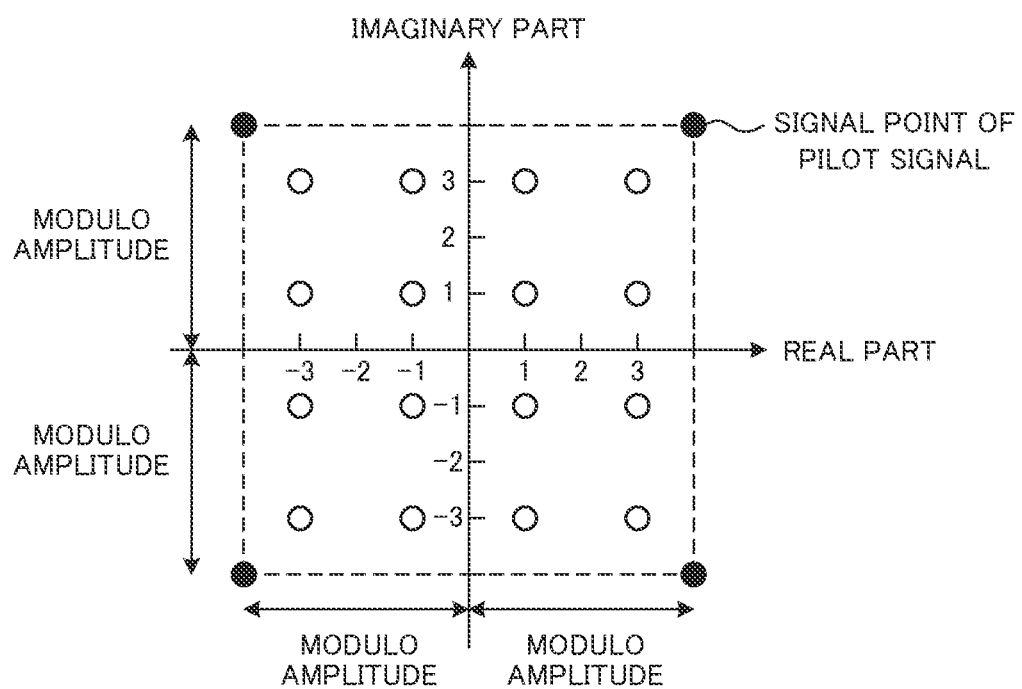

For example, as illustrated in FIG. 12A, it is assumed that the modulation scheme is 16 QAM, and a distance between signal points adjacent to each other on the constellation is "2". Here, an amplitude of a transmission signal corresponds to a distance between the origin of the constellation and a corresponding signal point. Furthermore, an amplitude is determined for each of a real part and an imaginary part of electric field information. In this case, coordinates at which signal points are arranged in a real number direction of the constellation are "−3", "−1", "1", and "3", and therefore a maximum amplitude of a real part is "3". Coordinates at which signal points are arranged in an imaginary number direction of the constellation are "3", "−1", "1", and "3", and therefore a maximum amplitude of an imaginary part is also "3". Accordingly, in this case, the modulo amplitude is determined to be a value that is larger than "3". As an example, it is preferable that the modulo amplitude be the integral multiple of a distance between signal points adjacent to each other. In the example illustrated in FIG. 12B, the modulo amplitude is twice the distance between signal points adjacent to each other. Then, amplitude information indicating the modulo amplitude is provided to the pilot signal inserter 14 and the THP processor 15.

The THP processor 15 performs modulo calculation according to the amplitude information. Here, it is assumed modulo amplitude indicated by the amplitude that a information is "M". In this case, the modulo calculator Mod performs the calculation described below.

(1) When a value of a real part of an electric field of a signal is larger than M, 2M is subtracted from the value.
(2) When a value of a real part of an electric field of a signal is smaller than −M, 2M is added to the value.
(3) When a value of an imaginary part of an electric field of a signal is larger than M, 2M is subtracted from the value.
(4) When a value of an imaginary part of an electric field of a signal is smaller than −M, 2M is added to the value.

The pilot signal inserter 14 generates a pilot signal, and inserts the pilot signal into the main signal. In this example, the pilot signal is transmitted according to QPSK. Therefore, each symbol that transmits the pilot signal carries two bits. Furthermore, the pilot signal inserter 14 generates symbols for transmitting the pilot signal in accordance with the amplitude information provided from the amplitude determination unit 31. Here, when a modulo amplitude indicated by the amplitude information is "M", the pilot signal inserter 14 generates symbols for transmitting the pilot signal by using, for example, the mapping pattern described below.

(1) When the pilot signal is "11", a value of a real part is M, and a value of an imaginary part is M.
(2) When the pilot signal is "01", a value of a real part is −M, and a value of an imaginary part is M.
(3) When the pilot signal is "00", a value of a real part is −M, and a value of an imaginary part is −M.
(4) When the pilot signal is "10", a value of a real part is M, and a value of an imaginary part is −M.

As described above, an amplitude of the pilot signal is equal to an amplitude of modulo calculation. Note that the mapping pattern of the pilot signal is not limited to the example described above.

Figure 13:
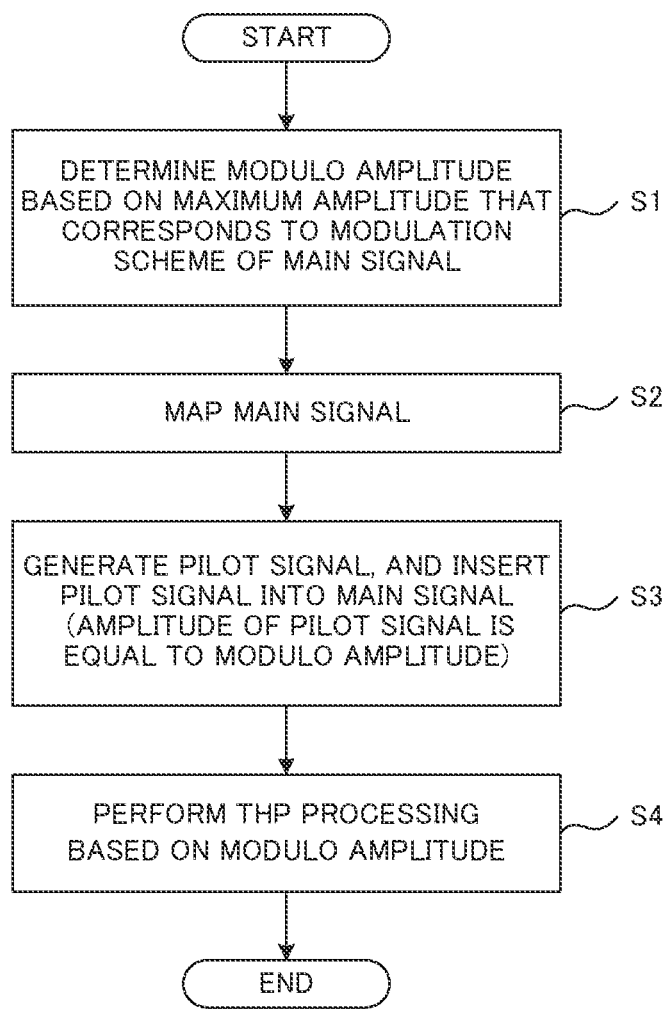
FIG. 13 is a flowchart illustrating an example of a process performed by an optical transmitter.

FIG. 13 is a flowchart illustrating an example of a process performed by the optical transmitter 10. Note that this flowchart only indicates a part of the process performed by the optical transmitter 10. Specifically, this flowchart indicates processes performed by the amplitude determination unit 31, the constellation mapper 13, the pilot signal inserter 14, and the THP processor 15 that are illustrated in FIG. 11.

In S1, the amplitude determination unit 31 determines a modulo amplitude based on a maximum amplitude that corresponds to a modulation scheme of a main signal. The modulo amplitude is determined, for example, to be larger than the maximum amplitude that corresponds to the modulation scheme of the main signal, and not to exceed an input range of the DAC 17. In S2, the constellation mapper 13 maps the main signal to a corresponding signal point on a constellation in accordance with the specified modulation scheme. In S3, the pilot signal inserter 14 generates a pilot signal, and inserts the pilot signal into the main signal. At this time, an amplitude of the pilot signal is equal to the modulo amplitude. The pilot signal may be inserted into the main signal in a time domain. In S4, the THP processor 15 performs feedback equalization on a transmission signal (the main signal into which the pilot signal has been inserted). Furthermore, when a signal obtained as a result of the feedback equalization exceeds a range of the modulo amplitude, the THP processor 15 performs modulo calculation. Then, the optical transmitter 10 transmits a signal generated by the THP processor 15 to a reception node.

Note that the error correction encoder 12, the constellation mapper 13, the pilot signal inserter 14, the THP processor 15, and the amplitude determination unit 31 may be implemented, for example, by a processor system including a processor and a memory, or a digital signal processor (DSP). Furthermore, the error correction encoder 12, the constellation mapper 13, the pilot signal inserter 14, the THP processor 15, and the amplitude determination unit 31 may be implemented by a hardware circuit.

Alternatively, the error correction encoder 12, the constellation mapper 13, the pilot signal inserter 14, the THP processor 15, and the amplitude determination unit 31 may be implemented by a combination of software and the hardware circuit.

Figure 14:
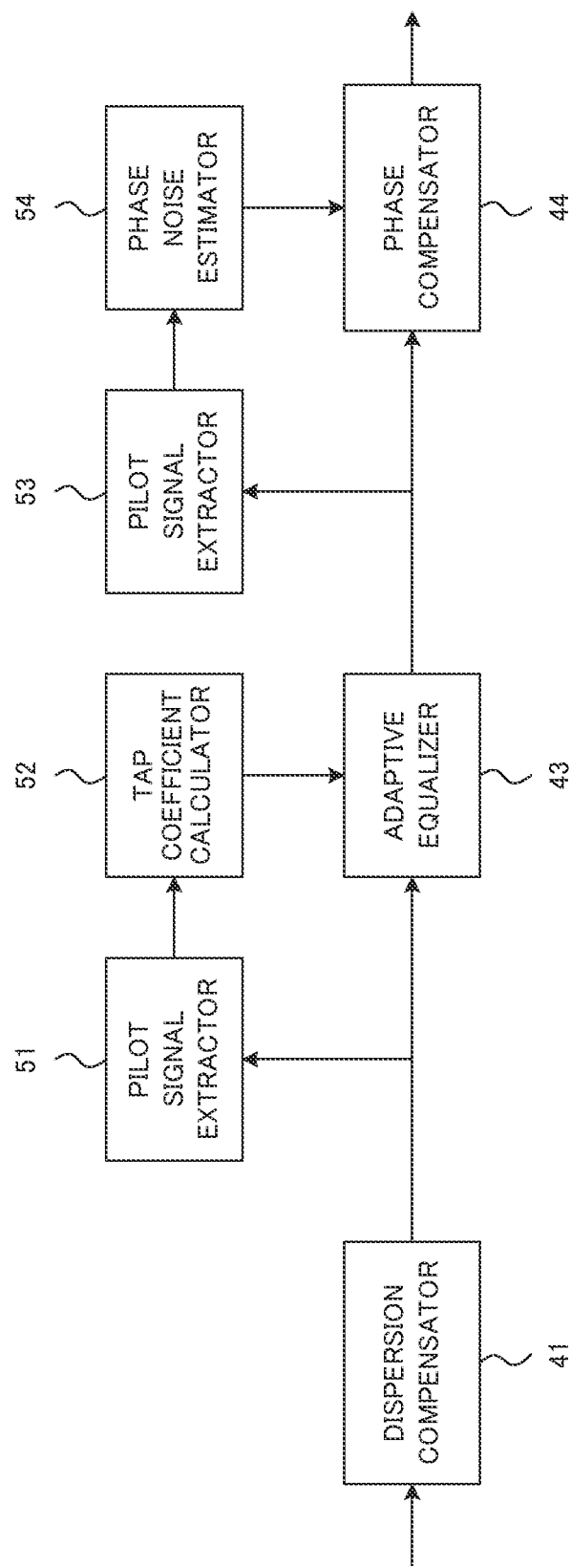
FIG. 14 illustrates an example of a method for compensating for distortion of a main signal by using a pilot signal.

FIG. 14 illustrates an example of a method for compensating for distortion of a main signal by using a pilot signal in the optical receiver 20. In this example, the adaptive equalizer 43 compensates for residual distortion by using the pilot signal, and the phase compensator 44 compensates for phase noise by using the pilot signal.

A pilot signal extractor 51 extracts the pilot signal from an output signal of the dispersion compensator 41. That is, the pilot signal extractor 51 acquires electric field information of the pilot signal. A tap coefficient calculator 52 calculates tap coefficients to be used in the adaptive equalizer 43 in accordance with the electric field information acquired by the pilot signal extractor 51. The adaptive equalizer 43 is configured by a digital filter such as an FIR filter. In this case, the tap coefficient calculator 52 calculates tap coefficients to be used at each tap of this digital filter. The tap coefficients are calculated according to, for example, the constant modulus algorithm (CMA) or the least square mean (LMS) algorithm. Note that the tap coefficient calculator 52 may, for example, periodically calculate the tap coefficients. In this case, the tap coefficients to be used by the adaptive equalizer 43 are always updated to current values.

A pilot signal extractor 53 extracts the pilot signal from an output signal of the adaptive equalizer 43. That is, the pilot signal extractor 53 acquires electric field information of the pilot signal in which distortion has been compensated for. A phase noise estimator 54 estimates phase noise based on the electric field information acquired by the pilot signal extractor 53. At this time, the phase noise estimator 54 may estimate phase noise according to the Viterbi-Viterbi algorithm. Then, the phase compensator 44 compensates for the phase noise estimated by the phase noise estimator 54 in the main signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
a modulator that modulates a first signal to generate a first modulated signal;
a determinator that determines a modulo amplitude that is larger than an amplitude of the first modulated signal based on a modulation scheme of the first signal;
an inserter that inserts a second modulated signal into the first modulated signal to generate a transmission signal;
a signal processor that generates a pre-equalized signal by performing feedback equalization on the transmission signal, the feedback equalization correcting a symbol of the transmission signal by using an amplitude of one or a plurality of previous symbols, and performs subtraction and/or addition of amplitude of the pre-equalized signal and a value related to the modulo amplitude; and
a transmission circuit that generates a modulated optical signal based on an output signal of the signal processor and transmits the modulated optical signal to a reception node, wherein
an amplitude of the second modulated signal is equal to the modulo amplitude.

2. The optical transmitter according to claim 1, wherein the signal processor performs the subtraction of the amplitude of the pre-equalized signal such that the amplitude of the pre-equalized signal is smaller than the value related to the modulo amplitude, when the amplitude of the pre-equalized signal is larger than the value related to the modulo amplitude.

3. The optical transmitter according to claim 1, wherein the second modulated signal is a QPSK (quadrature phase shift keying) signal in which each of the symbols is allocated to a first signal point, a second signal point, a third signal point, or a fourth signal point on a constellation, and
when the modulo amplitude is M,
a value of a real part and a value of an imaginary part of the first signal point are respectively M and M,
the value of the real part and the value of the imaginary part of the second signal point are respectively −M and M,
the value of the real part and the value of the imaginary part of the third signal point are respectively −M and −M, and
the value of the real part and the value of the imaginary part of the fourth signal point are respectively M and −M.

4. The optical transmitter according to claim 1, wherein the first modulated signal is a 16 QAM (quadrature amplitude modulation) signal, and
the modulo amplitude is twice a distance between signal points adjacent to each other according to 16 QAM on a constellation.

5. The optical transmitter according to claim 1, further comprising a digital-to-analog converter that converts an output signal of the signal processor into an analog signal, wherein
the transmission circuit generates the modulated optical signal based on an output signal of the digital-to-analog converter, and
the modulo amplitude is determined not to exceed an input range of the digital-to-analog converter.

6. The optical transmitter according to claim 1, wherein the determinator determines the modulo amplitude based on a maximum amplitude that corresponds to the modulation scheme of the first signal.

7. The optical transmitter according to claim 1, wherein the signal processor performs the subtraction and/or the addition of the amplitude on the pre-equalized signal and twice the value related to the modulo amplitude.

* * * * *